US009952980B2

(12) United States Patent
Tsirkin et al.

(10) Patent No.: US 9,952,980 B2
(45) Date of Patent: Apr. 24, 2018

(54) DEFERRING REGISTRATION FOR DMA OPERATIONS

(71) Applicant: Red Hat Israel, Ltd., Raanana (IL)

(72) Inventors: Michael Tsirkin, Yokneam Yillit (IL); Marcel Apfelbaum, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 296 days.

(21) Appl. No.: 14/714,517

(22) Filed: May 18, 2015

(65) Prior Publication Data
US 2016/0342527 A1 Nov. 24, 2016

(51) Int. Cl.
G06F 13/28 (2006.01)
G06F 12/1081 (2016.01)

(52) U.S. Cl.
CPC .......... *G06F 12/1081* (2013.01); *G06F 13/28* (2013.01); *G06F 2212/657* (2013.01)

(58) Field of Classification Search
CPC .......... G06F 12/1081; G06F 15/17331; G06F 2212/657
See application file for complete search history.

(56) References Cited

U.S. PATENT DOCUMENTS

| | | | |
|---|---|---|---|
| 6,834,332 B2 | 12/2004 | Craddock et al. | |
| 7,552,298 B2 | 6/2009 | Bestler | |
| 7,685,330 B2 * | 3/2010 | Banerjee | H04L 49/90 710/22 |
| 8,010,718 B2 * | 8/2011 | Archer | G06F 13/30 710/15 |
| 8,635,430 B2 | 1/2014 | Craddock et al. | |
| 8,645,663 B2 * | 2/2014 | Kagan | G06F 12/1081 709/212 |
| 8,671,152 B2 | 3/2014 | Horie et al. | |
| 8,745,745 B2 | 6/2014 | Mooring et al. | |
| 8,937,949 B2 | 1/2015 | Manula et al. | |
| 9,053,068 B2 * | 6/2015 | Tsirkin | G06F 12/126 |
| 9,244,829 B2 * | 1/2016 | Manula | G06F 12/0223 |
| 9,286,232 B2 * | 3/2016 | Archer | G06F 12/1027 |
| 2006/0236063 A1 * | 10/2006 | Hausauer | G06F 12/1081 711/170 |
| 2008/0189432 A1 | 8/2008 | Abali et al. | |
| 2009/0083392 A1 * | 3/2009 | Wong | G06F 13/28 709/212 |
| 2014/0068133 A1 | 3/2014 | Tkacik et al. | |

(Continued)

OTHER PUBLICATIONS

"Analysis of the memory registration process in the mellanox infiniband software stack" from Euro-Par'06 Proceedings of the 12th international conference on Parallel Processing; pp. 124-133, Dated Aug. 28, 2006.*

(Continued)

*Primary Examiner* — Brian T Misiura
(74) *Attorney, Agent, or Firm* — Lowenstein Sandler LLP (57) ABSTRACT

Systems and methods for deferring registration for Direct Memory Access (DMA) operations. An example method may comprise: receiving a memory region registration request identifying a memory region for a direct memory access (DMA) operation; generating a local key for the memory region; receiving a DMA work request referencing the local key; and responsive to determining that an amount of pinned memory is below a threshold, registering the memory region for DMA transfer.

20 Claims, 4 Drawing Sheets

(56) References Cited

U.S. PATENT DOCUMENTS

| | | | |
|---|---|---|---|
| 2016/0170910 A1* | 6/2016 | Inamdar | G06F 12/1475 |
| | | | 711/163 |
| 2016/0239430 A1* | 8/2016 | Tsirkin | G06F 12/109 |
| 2016/0350260 A1* | 12/2016 | Tsirkin | G06F 15/167 |
| 2016/0350261 A1* | 12/2016 | Tsirkin | G06F 15/17331 |

OTHER PUBLICATIONS

"Reducing the Impact of Memory Registration in InfiniBand"—Euro-Par'06 Proceedings of the 12th international conference on Parallel Processing; 13 Pages, Dated Aug. 28, 2006.*

Liu, Jiuxing, et al., "High Performance VMM-Bypass I/O in Virtual Machines", IBM T.J. Waston Research Center; The Ohio State University, Apr. 18, 2006, pp. 1-32 https://www.usenix.org/legacy/event/usenix06/tech/full_papers/liu/liu_html/usenix06.html.

"RDMA Aware Networks Programming User Manual", Rev. 1.7 Mellanox Technologies, 2005, 216 pages http://www.mellanox.com/related-docs/prod_software/RDMA_Aware_Programming_user_manual.pdf.

Westrelin, Roland, et al., "Studying Network Protocol Offload With Emulation: Approach and Preliminary Results", Sun Microsystems, Inc., Santa Clara, CA, 2004, 7 pages http://www.hoti.org/hoti12/program/papers/2004/paper4.3.pdf.

* cited by examiner

DEFERRING REGISTRATION FOR DMA OPERATIONS

TECHNICAL FIELD

The present disclosure is generally related to virtualized computer systems, and is more specifically related to systems and methods for performing Direct Memory Access (RDMA) operations.

BACKGROUND

Direct Memory Access (DMA) herein refers to a method allowing a computer system to move memory regions directly to and/or from the system memory, bypassing the processor. Remote Direct Memory Access (RDMA) is a method allowing a computer system to directly read or modify the memory of another computer system. While in traditional socket-based networks, applications request network resources from the operating system (OS) through an API which handles the data transmission on their behalf, RDMA only employs the OS to establish an input/output channel, and then allows applications to directly exchange messages without further OS intervention. Thus, RDMA provides low latency through protocol stack bypass and copy avoidance, reduces processor utilization and memory bandwidth bottleneck, and optimizes bandwidth utilization.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for deferring registration for Direct Memory Access (DMA) operations.

Before performing an RDMA-based transfer, an application registers a memory region with an RDMA adapter. Such a memory region may comprise one or more memory buffers (e.g., one or more memory pages) having contiguous address ranges (e.g., contiguous virtual address ranges). In the process of registration, the memory region gets "pinned," i.e., designated as being non-swappable to a secondary storage. Then, the RDMA adapter stores the mapping of the virtual address of the memory region to the corresponding physical address.

Pinning large amounts of host memory prevents the memory from being overcommitted. However, overcommitting the memory may be highly desirable, especially for host computer systems running multiple virtual machines. Aspects of the present disclosure allow for deferring the memory registration and pinning for certain direct memory access operations, thus reducing the total amount of the host memory that needs to be pinned.

In accordance with one or more aspects of the present disclosure, the registration (and, hence, the pinning) operation may be deferred for memory regions that are created for local only memory access operations. In an illustrative example, responsive to receiving a request to register a memory region for local only memory access operations, the host computer system may generate a local key for the memory region and provide the local key to the requesting agent (e.g., a virtual machine) without registering the memory region, thus deferring the memory region registration and pinning operations until the requesting agent would submit a work request with respect to a memory region identified by the issued local key.

In certain implementations, the registration (and, hence, the pinning) operation may be further deferred if the total amount of pinned memory in the host computer system exceeds a threshold value. In an illustrative example, responsive to receiving a DMA work request with respect to a memory region identified by a previously issued unregistered local key, the host computer system may register and pin the memory region responsive to ascertaining that the total amount of pinned memory is below a threshold value; otherwise, the host computer system may queue the work request until such time when the total amount of pinned memory would fall below the threshold value. Upon completing the DMA transfer operation, the memory region may be unregistered and unpinned, thus freeing up the system memory for registering other memory regions to be transmitted.

The methods described herein below may be implemented by hypervisors running on host computer systems to enable virtual machine live migration, as well as by non-virtualized computer systems. Various aspects of the above referenced methods and systems are described in details herein below by way of examples, rather than by way of limitation.

Figure 1:
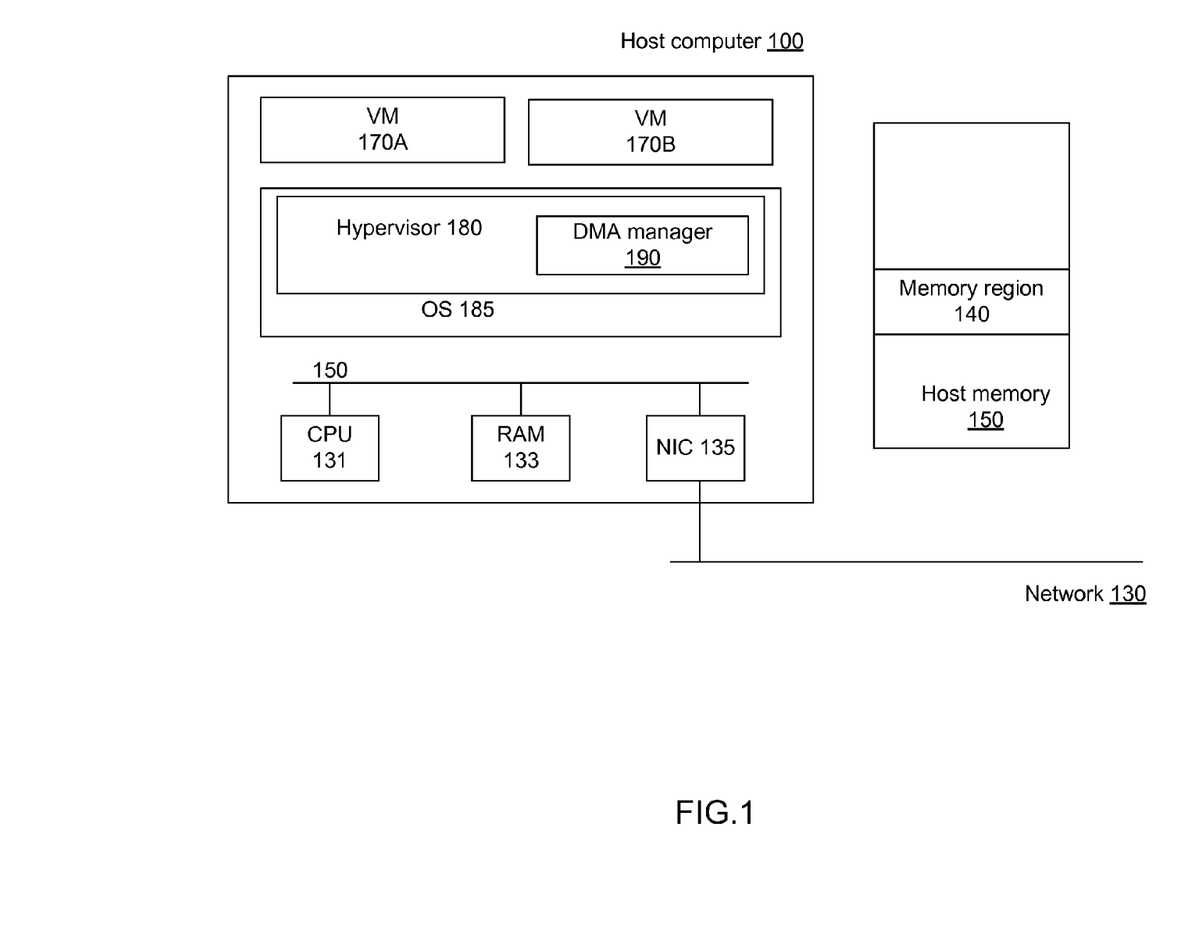
FIG. 1 depicts a high-level component diagram of one illustrative embodiment of a computer system 1000 in accordance with one or more aspects of the present disclosure.

FIG. 1 depicts a high-level component diagram of one illustrative example of a computer system 100 operating in accordance with one or more aspects of the present disclosure. "Computer system" herein shall refer to a system comprising one or more processors, one or more memory devices, and one or more input/output (I/O) interfaces.

Computer system 100 may comprise one or more processors 131 communicatively coupled to a memory device 133 and a network interface controller (NIC) 135. Local connections within host computer system 110, including connections between processor 131, memory device 133, and NIC 135, may be provided by one or more local buses 150 of a suitable architecture.

"Processor" or "processing device" herein shall refer to a device capable of executing instructions encoding arithmetic, logical, or I/O operations. In an illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "Network interface adapter" herein shall refer to a device capable of implementing a physical layer and data link layer standard (such as Ethernet or InfiniBand).

In an illustrative example, as schematically illustrated by FIG. 1, computer system 100 may run multiple virtual machines 170 by executing a software layer 180, often referred to as "hypervisor," above the hardware and below the virtual machines. In certain implementations, hypervisor 180 may be a component of operating system 185 executed by host computer system 100. Alternatively, hypervisor 180 may be provided by an application running under host operating system 185, or may run directly on the host computer system 100 without an operating system beneath it. Hypervisor 180 may abstract the physical layer, including processors, memory, and I/O devices, and present this abstraction to virtual machines 170 as virtual devices, including virtual processors, virtual memory, and virtual I/O devices.

DMA manager component 190 running on host computer system 100 may perform various DMA functions in accordance with one or more aspects of the present disclosure. In certain implementations, DMA manager component 190 may be implemented as a software component invoked by hypervisor 180. Alternatively, functions of DMA manager component 190 may be performed by hypervisor 180.

Computer system 100 may support a virtual memory environment in which a virtual machine address space is simulated with a smaller amount of the host random access memory (RAM) and a backing store (e.g., a file on a disk or a raw storage device), thus allowing the host to over-commit the memory. The virtual machine memory space may be divided into memory pages which may be allocated in the host RAM and swapped to the backing store when necessary. The guest operating system may maintain a page directory and a set of page tables to keep track of the memory pages. When a virtual machine attempts to access a memory page, it may use the page directory and page tables to translate the virtual address into a physical address. If the page being accessed is not currently in the host RAM, a page-fault exception may be generated, responsive to which the host computer system may read the page from the backing store and continue executing the virtual machine that caused the exception.

Computer system 100 may be interconnected, via a network 130, with one or more remote computer systems (not shown in FIG. 1). In certain implementations, computer system 100 may support RDMA. An RDMA adapter 135 may be provided by an RDMA-enabled network interface controller (RNIC), such as an InfiniBand host channel adapter or an Ethernet adapter. RDMA adapter 135 may be programmed to directly read or write the user space memory.

In an illustrative example, RDMA transfers may be employed by host computer system 100 to migrate a virtual machine to a remote host computer system. Live migration may involve copying the virtual machine execution state comprising a plurality of memory pages from the origin host to the destination host while the virtual machine is still running on host computer system 100.

Before performing an RDMA operation with respect to a user space memory region, DMA manager component 190 may register the memory region with RDMA adapter 135. A memory region may comprise one or more memory buffers (e.g., memory pages) having contiguous address ranges (e.g., contiguous virtual address ranges).

Memory registration is a mechanism that allows an application to describe a plurality of virtually contiguous memory locations or a plurality of physically contiguous memory locations to the network adapter as a virtually contiguous memory region using virtual addresses.

In the process of registration, DMA manager component 190 may generate a local key and a remote key for the memory region and associate those key with the memory region base address. The local key is a numeric value that is used locally by the work request to identify the memory region and its associated access permissions. The remote key is provided to a remote RDMA adapter to allow a remote process access the local memory during RDMA operations.

In the process of registration, DMA manager component 190 may further "pin" the memory region, i.e., make it non-swappable to a secondary storage. Then, DMA manager component 190 may cause RDMA adapter 135 may store a mapping of the virtual address of the memory region to a corresponding physical address in the physical memory.

In the process of registration, access permissions are set for the memory region being registered. The access permissions specify local and/or remote read and/or write operations.

As noted herein above, pinning large amounts of host memory prevents the memory from being overcommitted. However, overcommitting the memory may be highly desirable, especially for host computer systems running multiple virtual machines.

Figure 2:
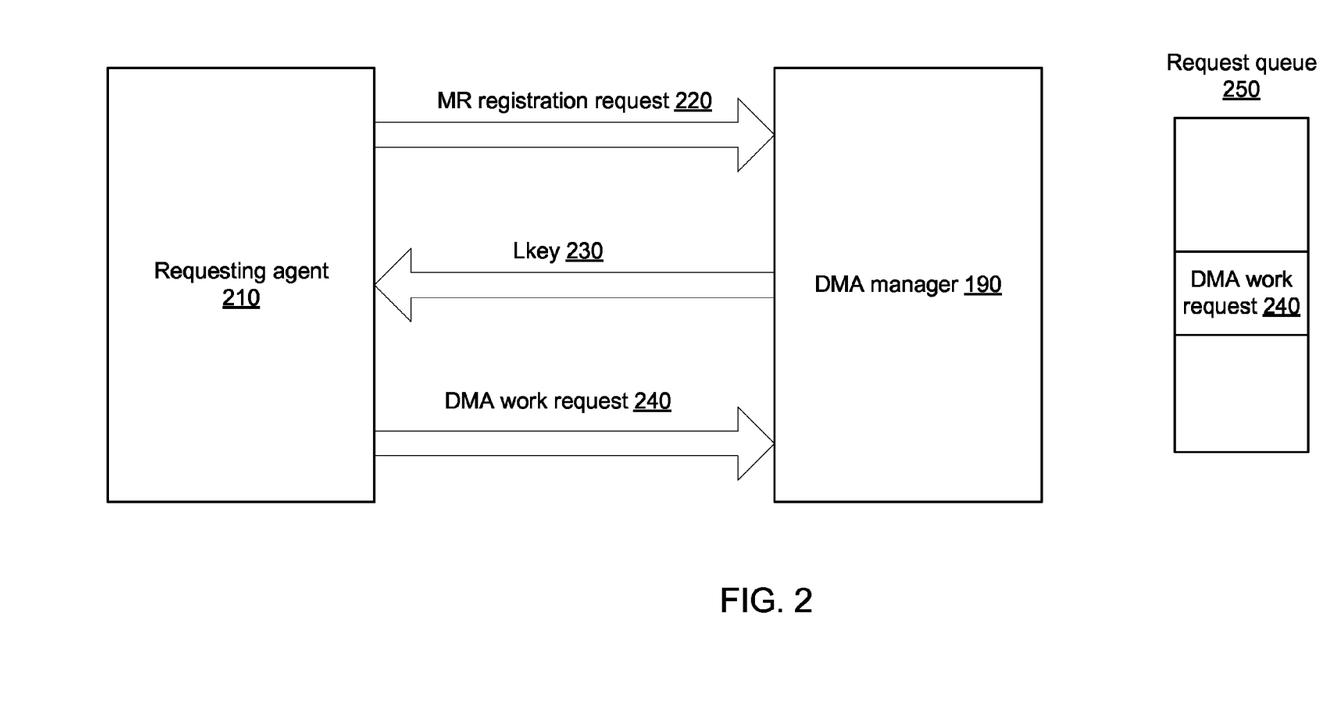
FIG. 2 schematically illustrates an example workflow of servicing a Direct Memory Access (DMA) request by a computer system operating in accordance with one or more aspects of the present disclosure.

In accordance with one or more aspects of the present disclosure, the registration (and, hence, the pinning) operation may be deferred for memory regions that are created for local only memory access operations. FIG. 2 schematically illustrates an example workflow of servicing a DMA request by a computer system operating in accordance with one or more aspects of the present disclosure.

As schematically illustrated by FIG. 2, responsive to receiving a request 220 to register a memory region for local only memory access operations, DMA manager component 190 may generate a local key 230 for the memory region and provide the local key to the requesting agent 210 without registering the memory region, thus deferring the memory region registration and pinning operations until the requesting agent would submit a work request with respect to a memory region identified by local key 230.

In certain implementations, the registration (and, hence, the pinning) operation may be further deferred if the total amount of pinned memory in the host computer system exceeds a threshold value. In an illustrative example, responsive to receiving a DMA work request 240 with respect to a memory region identified by a previously issued unregistered local key 230, DMA manager component 190 may determine whether the total amount of pinned memory is below a threshold value. If so, DMA manager component 190 may register and pin the memory region; otherwise, DMA manager component 190 may put work request 240 into a request queue 250. Work request 240 may be de-queued and serviced at a later time, responsive to determining, by DMA manager component 190, that the total amount of pinned memory has fallen below the threshold value.

Upon completing the DMA transfer operation specified by work request 240, DMA manager component 190 may de-register and unpin the memory region identified by local key 230, thus freeing up the system memory for registering other memory regions to be transmitted.

Figure 3:
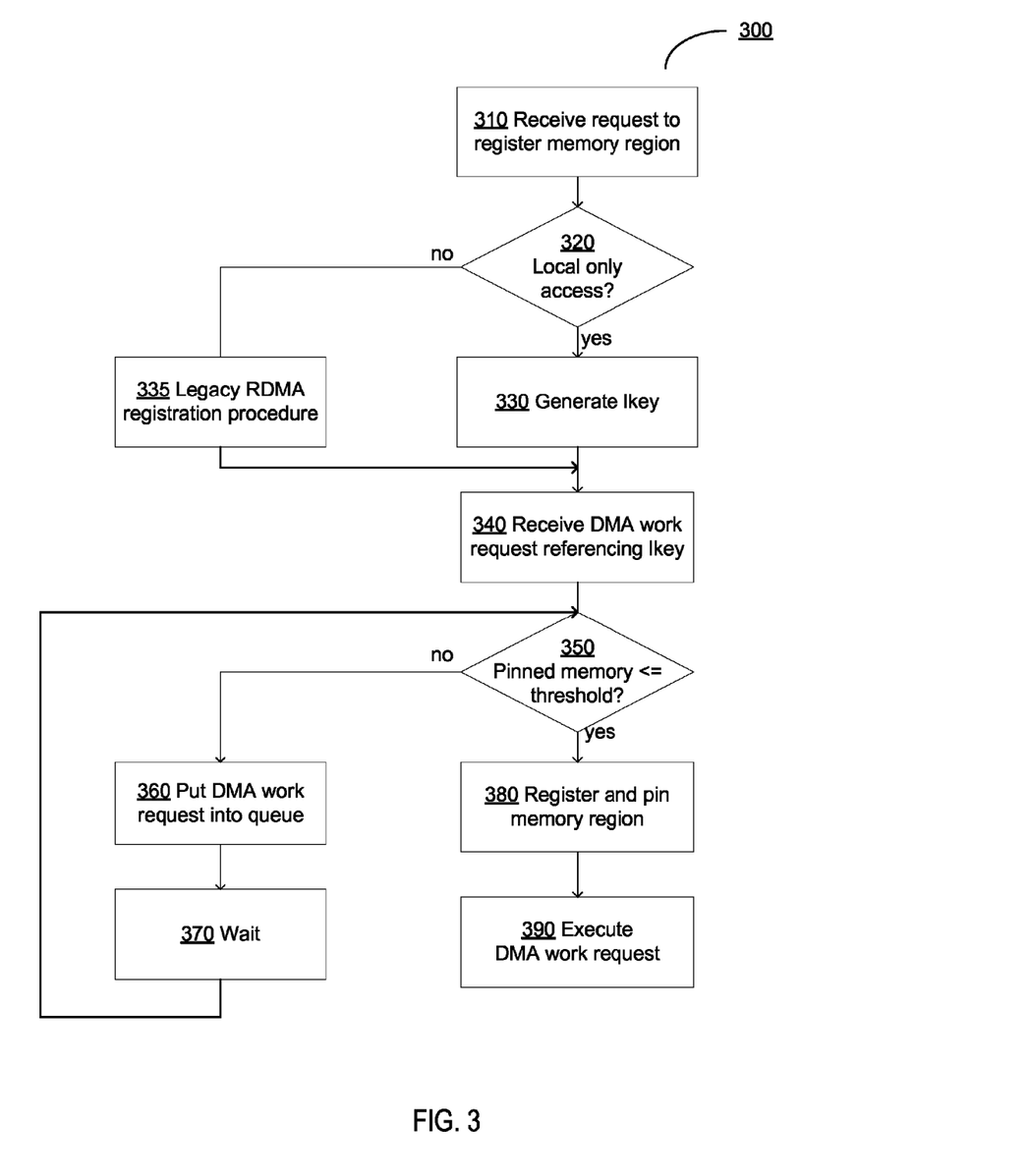
FIG. 3 depicts a flow diagram of an example method for deferring registration for DMA operations, in accordance with one or more aspects of the present disclosure.

FIG. 3 depicts a flow diagram of one illustrative example of a method 300 for deferring registration for DMA operations, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device implementing the method may receive a request to register a memory region for a DMA operation.

Responsive to determining, at block 320, that the request specifies a local only access to the memory region, the processing may continue at block 330; otherwise, the method may branch to block 335 to execute the legacy RDMA registration procedure.

At block 330, the processing device may generate a local key for the memory region and provide the generated local key to the requesting agent without registering the memory region. The local key is a numeric value that is used locally by the work request to identify the memory region and its associated access permissions, as described in more details herein above. In certain implementations, the processing device may further storing, in a memory data structure, a mapping of the local key to the address of the memory region in the requesting agent's address space.

At block 340, the processing device may receive a DMA work request with respect to a memory region identified by the previously issued unregistered local key.

Responsive to ascertaining, at block 350, that the total amount of pinned memory in the computer system is below a threshold value, the method may branch to block 380; otherwise, at block 360, the processing device may put the DMA work request into a request queue, from which it would be de-queued at a later time, by cycling back to block 350.

At block 380, the processing device may register the memory region for DMA transfer. In an illustrative example, registering the memory region comprises pinning the memory, as described in more details herein above.

At block 390, the processing device may submit the work request for execution by the DMA adapter, and the method may terminate.

Figure 4:
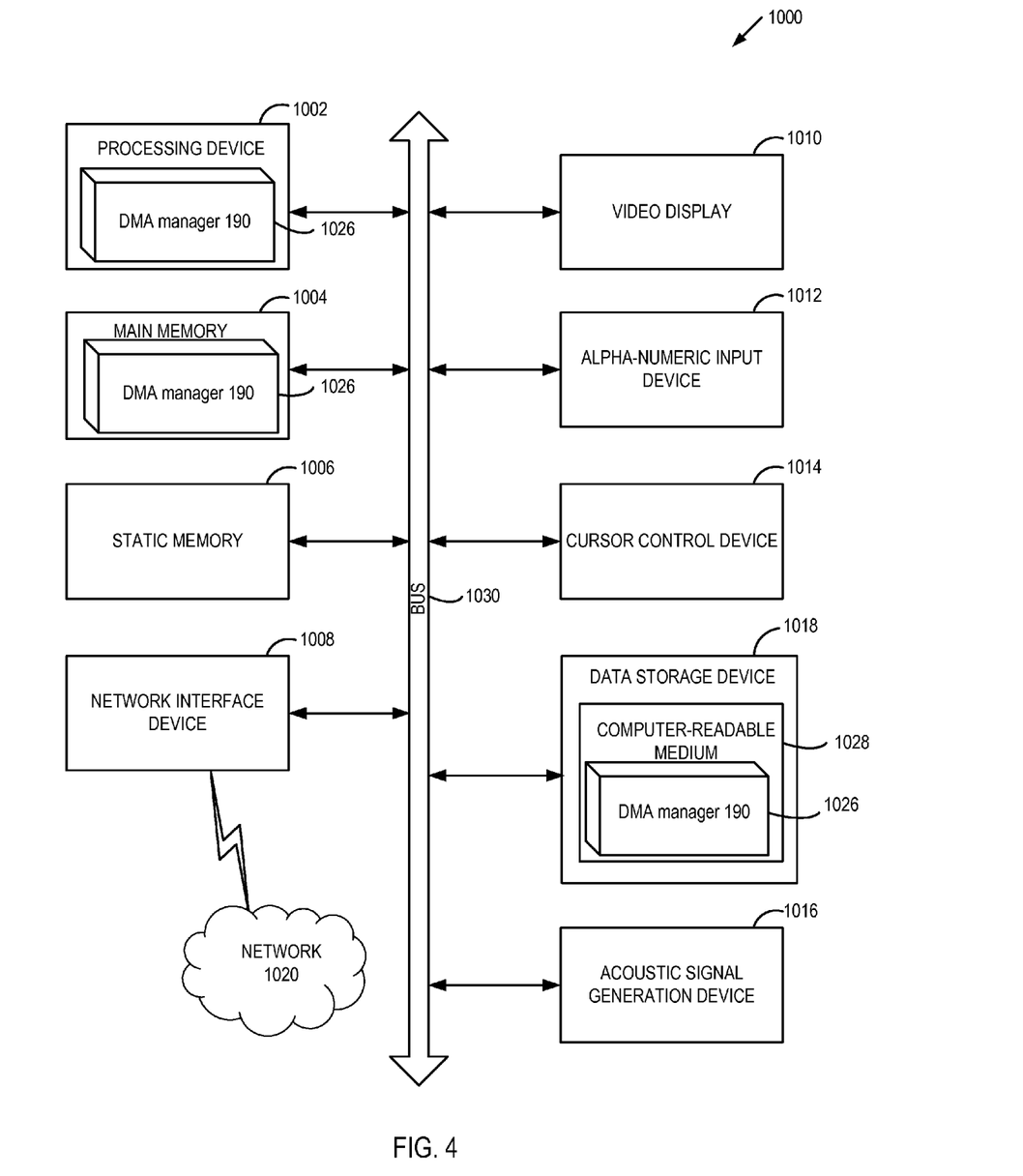
FIG. 4 depicts a block diagram of an illustrative computer system operating in accordance with the examples of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute DMA manager component 190 implementing method 300 for deferring registration for DMA operations.

Example computer system 1000 may further comprise a network interface controller 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of DMA manager component 190 implementing method 300 for deferring registration for DMA operations.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface controller 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The invention claimed is:

1. A method, comprising:
   receiving, by a processing device of a computer system, a memory region registration request identifying a memory region for a direct memory access (DMA) operation;
   generating a local key for the memory region;
   deferring registration of the memory region until receiving a DMA work request referencing the local key; and
   responsive to determining that a total amount of pinned memory in the computer system is below a threshold, registering the memory region for DMA transfer, wherein the pinned memory is designated as being non-swappable to a secondary storage.

2. The method of claim 1, wherein the memory region registration request specifies a local only access to the memory region.

3. The method of claim 1, wherein generating the local key for the memory region comprises storing, in a memory, a mapping of the local key to a memory address in an address space of a requesting agent.

4. The method of claim 1, wherein generating the local key for the memory region comprises providing the local key to a requesting agent.

5. The method of claim 1, wherein registering the memory region comprises pinning the memory region.

6. The method of claim 1, further comprising:
   causing a DMA adapter to execute the DMA work request.

7. The method of claim 1, further comprising:
   responsive to determining that the total amount of pinned memory is above the threshold, queuing the DMA work request in a queue.

8. The method of claim 1, further comprising:
   responsive to detecting that the DMA work request has been completed, de-registering the memory region.

9. A system, comprising:
   a memory; and
   a processing device operatively coupled to the memory, the processing device to:
      receive a memory region registration request identifying a memory region for a direct memory access (DMA) operation;
      generate a local key for the memory region;
      deferring registration of the memory region until receiving a DMA work request referencing the local key; and
      responsive to determining that a total amount of pinned memory in the system is below a threshold, register the memory region for DMA transfer, wherein the pinned memory is designated as being non-swappable to a secondary storage.

10. The system of claim 9, wherein the memory region registration request specifies a local only access to the memory region.

11. The system of claim 9, wherein to generate the local key for the memory region, the processing device is to store, in a memory, a mapping of the local key to a memory address in an address space of a requesting agent.

12. The system of claim 9, wherein to generate the local key for the memory region, the processing device is to provide the local key to a requesting agent.

13. The system of claim 9, wherein to register the memory region, the processing device is to pin the memory region.

14. The system of claim 9, wherein the processing device is further to:
cause a DMA adapter to execute the DMA work request.

15. The system of claim 9, wherein the processing device is further to:
responsive to determining that the total amount of pinned memory is above the threshold, queue the DMA work request in a queue.

16. The system of claim 9, wherein the processing device is further to:
responsive to detecting that the DMA work request has been completed, de-register the memory region.

17. A computer-readable non-transitory storage medium comprising executable instructions to cause a processing device of a computer system to:
receive a memory region registration request identifying a memory region for a direct memory access (DMA) operation;
generate a local key for the memory region;
deferring registration of the memory region until receiving a DMA work request referencing the local key; and
responsive to determining that a total amount of pinned memory in the computer system is below a threshold, register the memory region for DMA transfer, wherein the pinned memory is designated as being non-swappable to a secondary storage.

18. The computer-readable non-transitory storage medium of claim 17, wherein the memory region registration request specifies a local only access to the memory region.

19. The computer-readable non-transitory storage medium of claim 17, wherein executable instruction to generate the local key for the memory region comprise executable instructions causing the processing device to store, in a memory, a mapping of the local key to a memory address in an address space of a requesting agent.

20. The computer-readable non-transitory storage medium of claim 17, wherein executable instruction to generate the local key for the memory region comprise executable instructions causing the processing device to provide the local key to a requesting agent.

* * * * *